United States Patent
Fieni

[11] 3,891,271
[45] June 24, 1975

[54] SAFETY BELT SYSTEM
[75] Inventor: Walter Fieni, Paris, France
[73] Assignee: Societe Anonyme Francaise du Ferodo, France
[22] Filed: Jan. 10, 1973
[21] Appl. No.: 322,496

[30] Foreign Application Priority Data
Jan. 11, 1972 France .............................. 72.00825

[52] U.S. Cl. ........................... 297/386; 280/150.5 B
[51] Int. Cl. .......................................... A62b 35/00
[58] Field of Search ........... 297/386, 388, 385, 389; 248/412; 280/150.5 B

[56] References Cited
UNITED STATES PATENTS
1,570,479  1/1926  Goldensky .................. 297/386 UX
3,032,374  5/1962  Robinson et al. .................... 297/388
3,201,079  8/1965  Doetsch ............................ 248/412
3,343,874  9/1967  Hildebrandt ....................... 297/386
3,561,819  2/1971  Renncker ........................... 297/386
3,633,966  1/1972  Epple ............................... 297/386

Primary Examiner—James T. McCall

[57] ABSTRACT

A safety belt system for the occupant of or passenger in a vehicle, in particular an automobile. The system comprises a strap belt, and a mechanism whereby rebound movement of the belt is prohibited after the vehicle sustains sudden deceleration during which the occupant is projected forwards, stressing the belt.

3 Claims, 18 Drawing Figures

FIG. 1

PATENTED JUN 24 1975     SHEET 2     3,891,271

SAFETY BELT SYSTEM

The present invention relates to a safety belt system for the occupant of a vehicle, in particular an automobile.

In such a system the belt, which is usually attached to two points on the vehicle floor and to a third point on the upper portion, most often an upright, is designed to maintain the occupant or passenger on the seat and to restrain him in case he should be projected forwards by inertia as a result of a frontal impact sustained by the vehicle. The belt becomes operative when, as a result of being projected forwards, the occupant's body comes into contact therewith. However, the safety belt must, except in the event of an accident, leave the occupant a certain freedom of movement and also allow him to breathe; it must not therefore be permanently tight against the body, which would rapidly make it intolerable.

As a result, when an accident occurs the safety belt does not immediately become operative but only does so after the occupant's body has been projected forwards a certain distance. Consequently, the occupant's kinetic energy can only be absorbed for a fraction of his movement, with the result that considerable forces, greater than those which he is capable of undergoing without danger, may be applied to him.

This drawback is more marked when the belt device is provided with a wind and unwind reel, the use of which adds an element of play inherent in the construction of the reel mechanism and lengthens its impact response time, i.e., the time elapsing between the moment of impact and that at which the reel locks to make the safety belt become operative.

Furthermore, the material constituting the belt, whatever the disposition of the attachment points, is by its very nature elastic, so that after performing its function of limiting forward movement, the belt draws the occupant backwards, sometimes so violently that he suffers serious consequences.

It is an object of the invention to provide an installation which remedies this drawback and wherein the belt after restraining the movement of the user does not draw him backwards.

Another object of the invention is to provide a safety belt system for the occupant of a vehicle, particularly an automobile, satisfying all the above mentioned requirements, i.e., capable, on the one hand, of becoming operative as soon as an accident occurs and preventing excessive stress from being exerted on the user and which, on the other hand, after limiting the movement that projects the user forwards, limits or eliminates the action tending to draw him backwards.

According to a first feature of the invention, the installation comprises means for unstressing the belt after it has reached its maximum degree of deformation.

According to yet another feature of the invention, means for stressing the belt almost instantaneously, when a vehicle equipped with the installation sustains an impact, are combined with means for limiting the stresses applied by the belt to the occupant projected forwards and which unstress the belt after the latter has reached its maximum degree of deformation.

In an exemplary embodiment comprising this feature, the installation includes a cylinder-piston unit harnessed to the extremity of a length of belt and suitable for stressing the belt almost instantaneously in the event of the vehicle equipped with the installation sustains an impact, while limiting the force restraining the user from moving forward. This installation is so designed that after a forward movement corresponding to the forward projection of the user's body, the beginning of the return movement causes fluid within the cylinder to communicate with the atmosphere, thus slackening the belt strap, which no longer performs its restraining function and prevents the user from being projected violently backwards.

According to another feature, the installation includes, in combination with means that almost instantaneously stress the belt when an impact is sustained by the vehicle to which it is fitted, means for limiting the stresses exerted by the belt on the occupant projected forward.

In one embodiment, the installation comprises a pistoncylinder unit harnessed to the extremity of a length of belt which, comprising means for stressing the belt through the action of fluid on the unit when the vehicle fitted with the installation sustains an impact, is so designed that an intentional fluid leak occurs when the force applied to the unit by the forward projection of the user exceeds a predetermined value.

In the following description, given for purposes of example only, reference is made to the attached drawings wherein.

Figure 1:
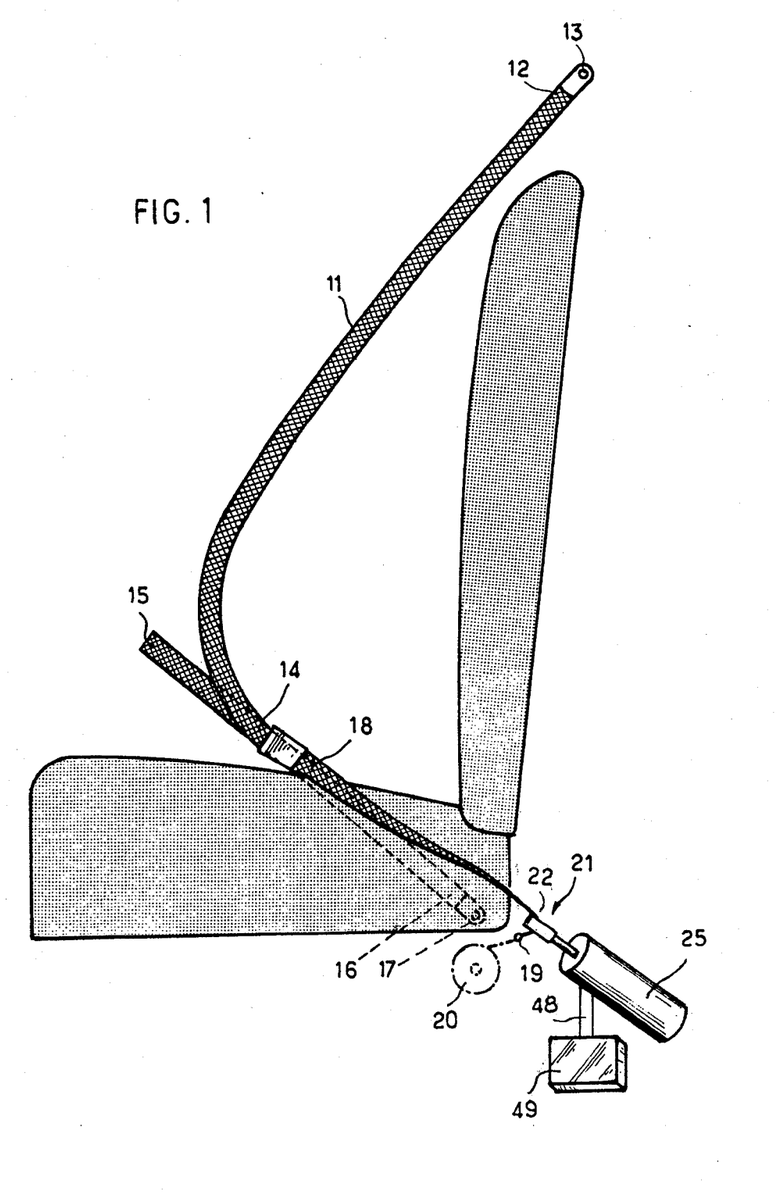
FIG. 1 is an elevation view of a first exemplary installation or system according to the invention.

In a first embodiment, the installation according to the invention comprises a belt of the conventional type with a cross-belt section 11 (FIG. 1), the upper end 12 of which is attached to a point 13 and the other end 14 of which is attached to a sub-abdominal section 15, one end 16 of which is attached at a first lower point 17, a common section 18, attached to the cross-belt section 11 and the sub-abdominal section 15, being attached at a second lower point 19. The attachment point may be a fixed point or the section 18 may be fed from a reel 20 comprising means for preventing its rotation, which become operative if the vehicle fitted with the installation sustains an impact.

The section 18 passes through a slide member 21 provided by a loop 22 forming the extremity of a rod 23 (FIGS. 2 and 3), sealingly penetrating by means of a packing 24 into a cylinder 25 the end 26 of which it traverses, and it is integral at its other end with a piston 28 slidingly fitted along a cylindrical wall 29, a seal 30 being interposed. The piston 28 comprises a piston body 31 extending by an element 32. The opposite end 35 of the cylinder 25 communicates with the atmosphere, for example through a central orifice 36 surrounded by a collar 33.

A solid ring 37 is fitted to the element 32 (see FIG. 4), its inside diameter 40 being greater than the outside diameter of the collar 33 and sufficiently approximating the diameter of the external surface 41 of the element 32 for the ring to be slidingly guided along said element.

Figure 4:
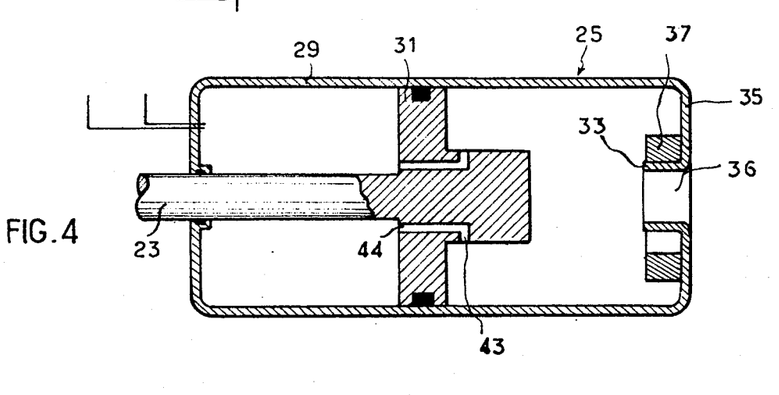
FIG. 4 is a view similar to that of FIG. 2 but representing condition.

Bores 43 provided in the piston emerge on the lateral surface of the element 32 at a distance from the inner forward face 42 of piston body 31, smaller than the thickness of ring 37, and their other extremities 44 emerge in a chamber 45 comprised between the outer external face 46 of the piston and the bottom 26.

Chamber 45 contains a pyrotechnical substance 47 which can be ignited by a current passing through a circuit 48 actuated by a device 49 sensitive to an impact sustained by the vehicle.

The bores 43 are advantageously distributed regularly from the angular point of view around the axis 50 common to the cylindrical wall 29 and the piston 28 with its rod, four bores having been provided in the embodiment represented.

Figure 2:
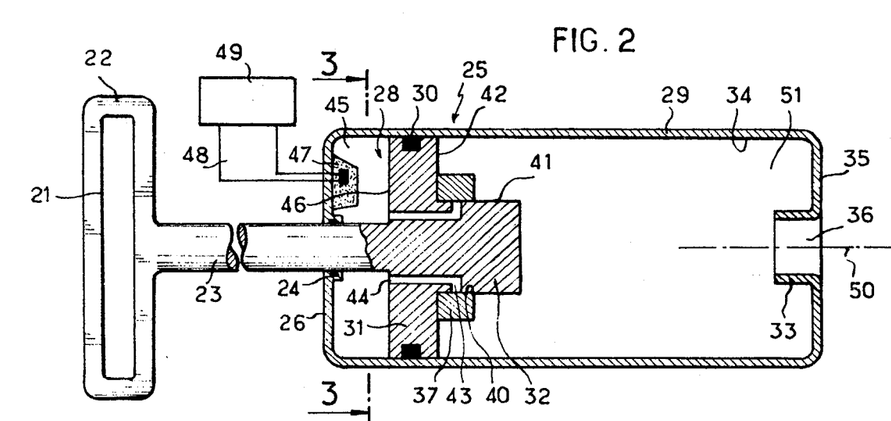
FIG. 2 is a part view of the installation of FIG. 1.
Figure 3:
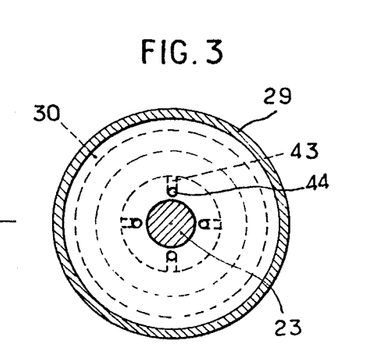
FIG. 3 is a cross-section along line 3—3 of FIG. 2.

Operation is as follows: The normal condition is as represented in FIG. 2, wherein the position of piston 28 in the cylinder 25 is that given upon mounting the assembly by tight fitting of the seal 30 and/or the packing 24.

Should a vehicle equipped with the installation sustain an impact exceeding a predetermined intensity, the device 49 causes a current to pass through circuit 48. The pyrotechnical substance 47 is ignited. This results in a pressure increase within chamber 45 in accordance with a law depending in particular on the combustion conditions for the pyrotechnical substance. The piston 28 is forced to the end 35 of cylinder 25, whereby piston rod 23 exerts a stress on the belt, apply almost instantaneously the sections of the belt passing through loop 22 against the occupant of the vehicle. During its displacement, the piston drives ring 37 and when the element 32 contacts collar 33, the inertial forces displace ring 37 to rest on said collar, thus uncovering the bores 43. The ring 37 remains on collar 33, offset in relation to axis 50, so that it is unable to return on element 32.

Alternatively, yielding catch means on the collar maintain ring 37 thereon after the element 32 has contacted it.

The belt is stressed by the forward projection of the occupant's body due to inertia; the belts maintaining the occupant's body limit its forward projection by reason of the compression of the gas contained in chamber 45 which passes into a rear chamber 51 of the cylinder; this passage takes place with throttling in the bores 43, so that an almost constant pressure is obtained in chamber 45, which limits the forces exerted by the belt on the occupant.

Figure 5:
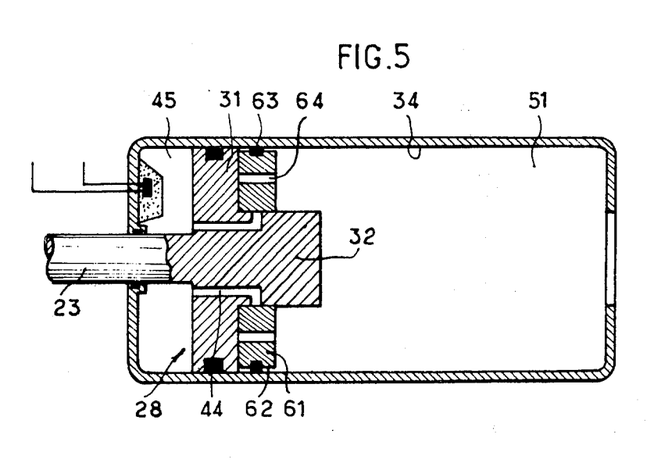
FIGS. 5 and 6 are views similar to that of FIGS. 2 and 3 but for another embodiment.
Figure 6:
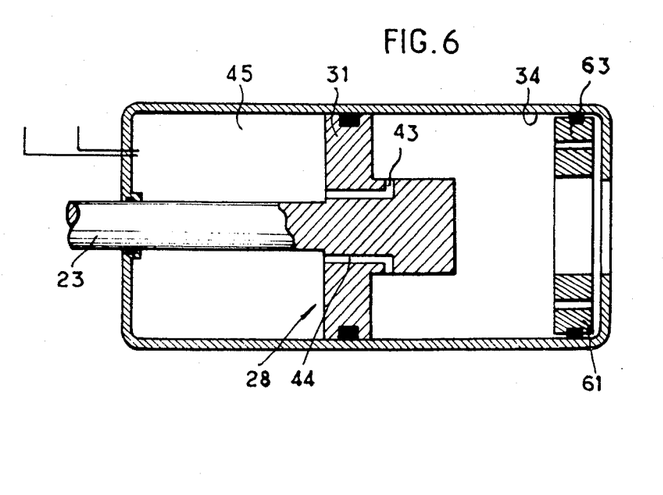

Reference is now made to another embodiment shown in FIGS. 5 and 6. In this embodiment, a disk 61 is fitted over an element 32 and is pierced by longitudinal channels 64, the diameter of its outer surface 62 being only slightly smaller than that of the internal surface 34 of the cylindrical wall 29, a sealing ring 63 being provided between said surface 62 and said inner surface.

In this embodiment, when the occupant's body moves forward, after piston 28 has been forced towards the end 35 of cylinder 25, driving with it the disk 62, the latter remains in the vicinity of end 35 owing to the holding effect of seal 63 (FIG. 6), uncovering the bores 43 of piston 28, which enables the gas contained in chamber 45 to pass with throttling through said bores to the rear chamber 51.

In the event of an impact of small or medium intensity, the safety belt functions in the normal manner. If the impact is of greater intensity, the pyrotechnical substance is ignited and operation takes place as above described.

The invention includes within its scope equipment for which no wind and unwind reel device is provided. The extremity of one section of the belt may be directly attached to the piston rod, or the latter may exert its force through a slide with which it is provided and through which passes the section of the belt the end of which is attached to a fixed point.

However, in a safety belt installation provided with a wind and unwind reel device, the invention provides means for actuating the locking of the reel device for a smaller deceleration value than that which actuates the ignition of the pyrotechnical substance and, in all cases, before the belt stressing means are actuated. The installation thus adapts itself to the seriousness of the accident.

In embodiments including a reel device, the reel may be borne directly by the piston rod.

Alternatively, the reel is attached to the section 11 of the belt, at the upper end 13 of the latter, one extremity of the sub-abdominal section being then directly attached to the rod of the cylinder piston unit for stressing the belt.

In a simplified embodiment of an installation according to the invention, neither ring 37 nor disk 61 is provided on piston 28. The latter is, in a first embodiment, constituted by a simple perforated disk while, in another embodiment, the piston is a solid disk, the force limiting effect being obtained by leakage of motor fluid between the lateral surface of the piston and the wall of the cylinder housing it.

Reference is now made to FIGS. 7 to 11 concerning yet another embodiment from of an installation according to the invention. A rod 123 (FIGS. 7 to 9) is attached in the earlier described manner to one section of the belt and sealingly penetrates, by means of a packing 124, into a cylinder 125 passing through its bottom 126, cylinder 125 accomodating a piston 128 with which the rod is integral. The piston is slidingly mounted along the cylindrical wall 129 of cylinder 125, a seal 130 being interposed. The piston 128 comprises a piston body 131 prolonged by a core element 132 on which is fitted with slight friction a ring 137, the outer surface of the ring cooperating with relatively substantial friction with the cylindrical wall 129.

Figure 7:
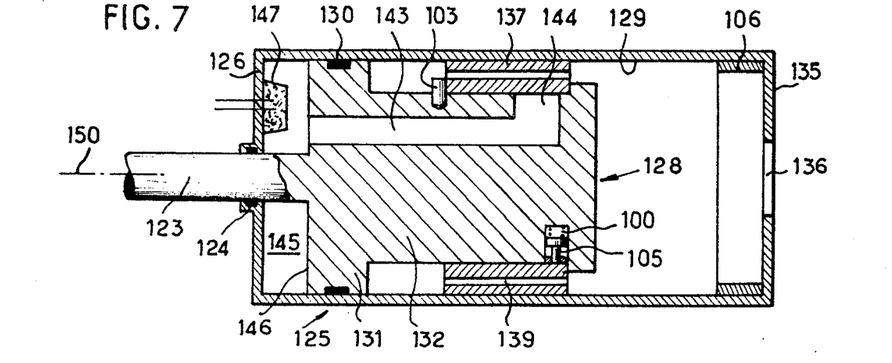
FIGS. 7, 8 and 9 are views similar to those of FIGS. 2 and 3 but for yet another form of embodiment.
Figure 8:
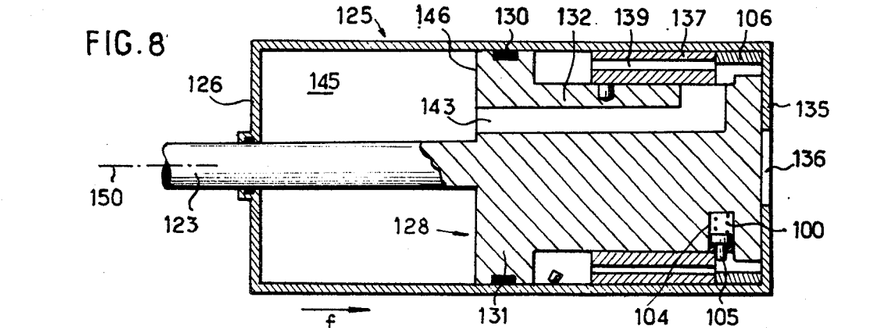
Figure 9:
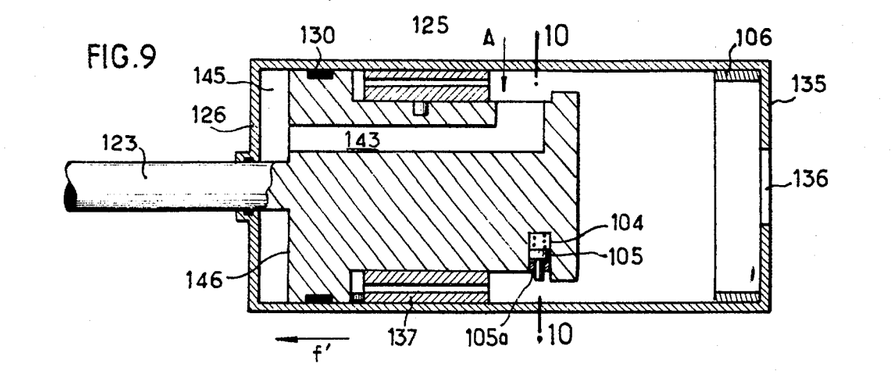
Figure 10:
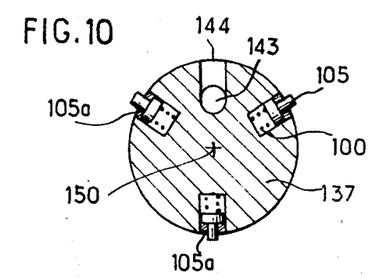
FIG. 10 is a cross-section along line 10—10 of FIG. 9.
Figure 11:
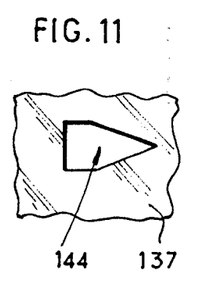
FIG. 11 is a part top view along arrow A of FIG. 9.

The ring 137 is pierced by longitudinal bores 139 and, in the normal state, which is as represented in FIG. 7, blocks the bore orifices 144, the cross section of which decreases from the front to the rear of the piston, as represented in FIG. 11, which orifices are connected to one or more ducts 143 provided in the piston and which emerge in a chamber 145 comprised between the outer frontal face 146 of the piston and the bottom 126 of cylinder 125.

The latter possesses, adjacent to its end 135 pierced by a central orifice 136 for communication with the atmosphere and, in the vicinity of the cylindrical wall 129, a member 106 adapted to cooperate with ring 137 when the rear extremity of piston 128 is close to end 135.

In core 132 of piston 128 are radially mounted pins 105, regularly angularly distributed around the axis 150 of the cylinder piston unit and subjected to the effect of springs 100 tending to cause them to project on the outer surface of core 132 when blind bores 104 in which they are housed are no longer blocked by ring 137 (FIGS. 8 and 10), stops 105a preventing them from being removed from bores 104.

This embodiment functions as follows: In normal state (FIG. 7), piston 128 is close to end 126 of cylinder 125 maintained in position by seal 130 and/or packing 124; ring 137 blocks the openings 144, and its position in relation to element 132 of piston 128 is ensured by one or more pins 103.

In the event of an impact exceeding a predetermined intensity sustained by the vehicle fitted with the installation, a pyrotechnical substance 147 contained in chamber 145 is ignited. The increase of pressure resulting in said chamber forces the piston ring unit 128,137 in the direction of arrow f, towards the end 135 of cylinder 125, applying the sections of the belt almost instantaneously against the occupant.

At the end of this piston-ring unit movement, the latter bears against element 106, breaks the pin or pins 103 and, as a result of its displacement in relation to element 132, uncovers a part of the openings 144 freeing pins 105 which, as a result of the action of springs 100, projects in relation to element 132 and prevent the uncovered part of the openings from being closed again by ring 137.

The forward movement of the occupant body, under the effect of the inertia forces, then draws the belt which pulls the piston ring unit in the direction of arrow f', the belt limiting the forward projection of the occupant's body while maintaining it as a result of the compression of the gas contained in chamber 125, which escapes to the atmosphere after throttling in the portion uncovered by ring 137 of the openings 144, thus limiting the forces exerted on the occupant.

Bores 139 of ring 137 prevent a differential pressure capable of hindering displacement from occurring the two terminal faces of said ring.

When the belt has reached its maximum degree of deformation, the pressure of the gas compressed in chamber 145 again causes the piston ring unit 128,137 to be displaced in the direction of arrow f. Piston 128 very slightly goes back as a result of this stress, while ring 137 remains in its previously reached position as a result of its outer surface being in frictional engagement with the cylindrical surface 129 of cylinder 125. This new relative displacement of ring 137 in relation to element 132 uncovers their openings 144 in the entirety, which causes chamber 145 to communicate with the atmosphere, with the result that the tensile stress on the strap or straps constituting the belt rapidly disappears, thus preventing the occupant's body from sustaining violent restraining forces.

Figure 12:
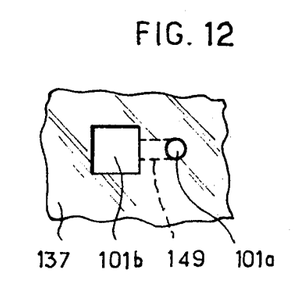
FIG. 12 is a view similar to that of FIG. 11 but for a further alternative embodiment.

In a further alternative embodiment diagramatically represented in FIG. 12, each opening 144, instead of having a variable cross-section, is constituted by two elementary openings separated from one another, one of which 101a, with a small cross-section, constitutes the throttling means which is used in the displacement along arrow f' of the piston-ring unit and the other one, 101b, with a larger cross-section, ensuring that chamber 145 is rapidly put in communication with the atmosphere during the short second movement in the direction of arrow f effected by piston 128.

Figure 13:
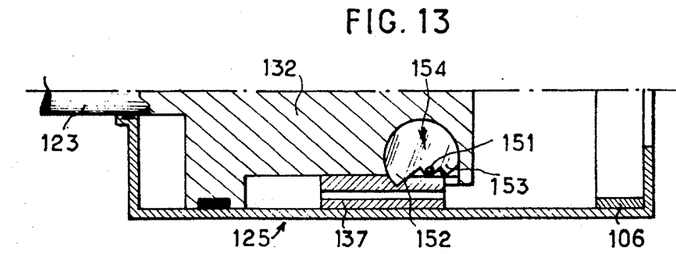
FIGS. 13 and 14 are semi-views similar to those of FIGS. 7 and 8 but for yet another embodiment.
Figure 14:
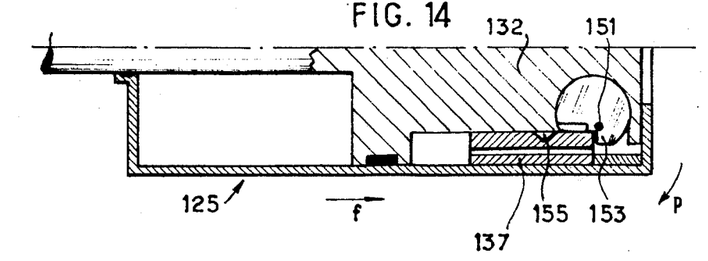

In yet another embodiment (FIGS. 13 and 14), pins 105, radially projecting as in the previous form of embodiment, are replaced by a locking finger 154 pivoting around an axis 151 integral with element 132, one portion 152 of which cooperates with a recess 155 the form of which matches ring 137. The relative movement of said ring in relation to the element 132, when the ring bears against member 106, causes the finger to pivot in the direction of arrow p and causes a lock 153 to project on the rear face of ring 137, preventing the latter from moving in relation to element 132 in the direction of arrow f (FIG. 14).

In the above described embodiments, the belt is stressed by the explosion of the pyrotechnical substance when the vehicle fitted with the installation sustains an impact.

Figure 2A:
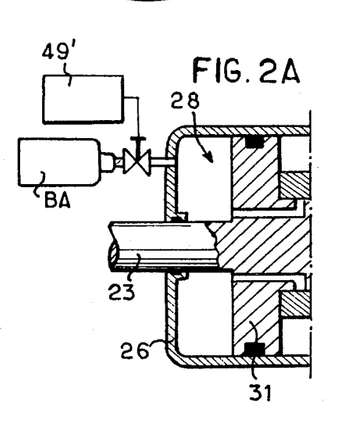
FIG. 2A is a part view of an alternative embodiment of the installation according to the invention constituting a partial view similar to FIG. 2.

The invention is not however limited thereto: hence it also provides for another source of pressurized gas, such as a cylinder of compressed air or the like BA (FIG. 2A), as a piston cylinder unit drive fluid, this gas source being actuated by appropriate means, for example electrical triggering, as diagramatically shown in FIG. 2A by a device 49'.

In an alternative embodiment, the piston-cylinder unit control and drive means are electromagnetic.

Figure 15:
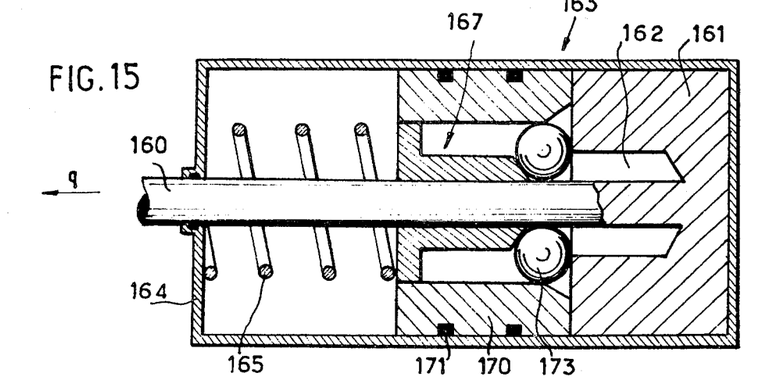
FIGS. 15, 16 and 17 are views of a preferred system according to the invention, its components being represented in different conditions.
Figure 16:
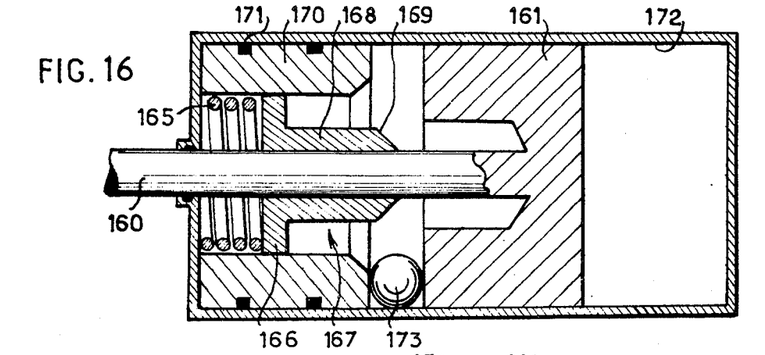
Figure 17:
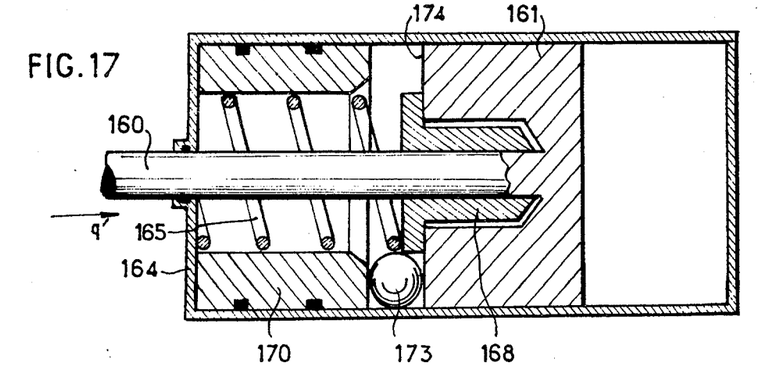

FIGS. 15 to 17 concern a preferred exemplary embodiment of a safety belt system according to the invention. The end of a rod 160 integral with a piston 161 and comprising a groove 162 at its point of junction with said rod is attached to a section of the belt. Piston 161 is contained in a housing 163 which may be flat and against a bottom 164 of which, penetrated by rod 160, bears one extremity of a spring 165, the other extremity of which cooperates with the end face 166 of a slide member 167 whose body 168 presents a bevelled end face 169 and which may be housed in groove 162. Slide member 167, mounted on rod 160, is surrounded by a ring 170 firmly maintained by friction, for example by means of packings 171, against the inner wall 172 of housing 163.

The internal diameter of ring 170 is such that the ring, in the initial state represented in FIG. 15, maintains one or more balls 173 bearing against rod 160 between the front face 174 of piston 161 and the bevelled face 169 of slide member 167.

Alternatively, a stack of resilient washers is provided in lieu of spring 165.

Spring 165 is so designed that its coils are not adjacent for the maximum force exerted on the corresponding anchoring point. Preferably, it is fitted pre-stressed to a value close to the maximum stress exerted on the anchoring point when an impact of the lowest intensity occurs at which the device must come into effect.

When, in the event of a vehicle equipped with the system according to the invention sustains an impact, the occupant's body is projected forward, i.e., in the direction of arrow q, the tensile stress applied by the belt to rod 160 to which it is harnessed causes the mobile unit constituted by piston 161, ring 170, slide member 167 and the ball or balls 173 to be displaced in the direction of arrow $q$ against the bias or spring 165.

When the belt has reached its maximum degree of deformation the action of spring 165 biased during the previous phase causes slide 167 to be displaced rearward in the direction of arrow $q'$. Since ring 170 remains in the forward end position previously reached, as represented in FIG. 16, owing to the friction resulting from its contact with walls 172, balls 173 leave bevelled face 169 of slide member 167, the body 168 of which penetrates into groove 162 of piston 161, at this time immobile, so that the occupant's body is not subjected to violent return forces.

Since the travel of the mobile unit in the direction of arrow $q$ is a function of the characteristics of spring 165, and that of slide member 167 in the direction of arrow $q'$ depends on the depth of the groove 162, it is possible to obtain optimum operating conditions by appropriately and independently selecting the spring characteristics and the groove dimensions.

What I claim is:

1. A safety belt system for restraining a passenger in a vehicle upon sudden deceleration of the vehicle, comprising: a strap belt extending across and in front of the passenger; a stationary cylinder housing mounted in the vehicle; a piston rod and a piston operatively connected to said belt; said piston being movably mounted within said cylinder housing while said piston rod is rigid with said piston; a slidable connection between said piston and an intermediate portion of said belt; a slide member located within said housing and surrounding said piston rod, said slide member being connected between said piston and said connection to the belt; a ring frictionally mounted within said housing for displacement by said piston when the latter is moved forwardly, toward said connection, upon a sudden deceleration of the vehicle, and adapted to surround said slide member; spring means urging said slide member constantly backwards, away from said connection; and retaining means within said ring and in said slide member for at least one ball initially lodged therein; wherein a backward rebound movement of said belt is prevented after the latter has reached its maximum degree of deformation, due to the backward movement of said slide member under the action of said spring means, while said ring remains in the forwardly displaced position, so that said ball wedges itself between said piston and said ring, while said piston rod remains stationary.

2. The safety belt system as defined in claim 1, wherein said piston is shaped with a recess in the area where said piston rod is connected to said piston; and said slide member has at least one protrusion with a shape matching that of said recess, into which it can enter during the backward movement of said slide member while said piston rod remains stationary.

3. The safety belt system as defined in claim 1, further comprising a retractor assembly for said strap belt.

* * * * *